Nov. 25, 1930.  S. PERRY  1,782,937
CONTROLLING MECHANISM FOR OIL BURNERS
Filed April 21, 1928    9 Sheets-Sheet 1
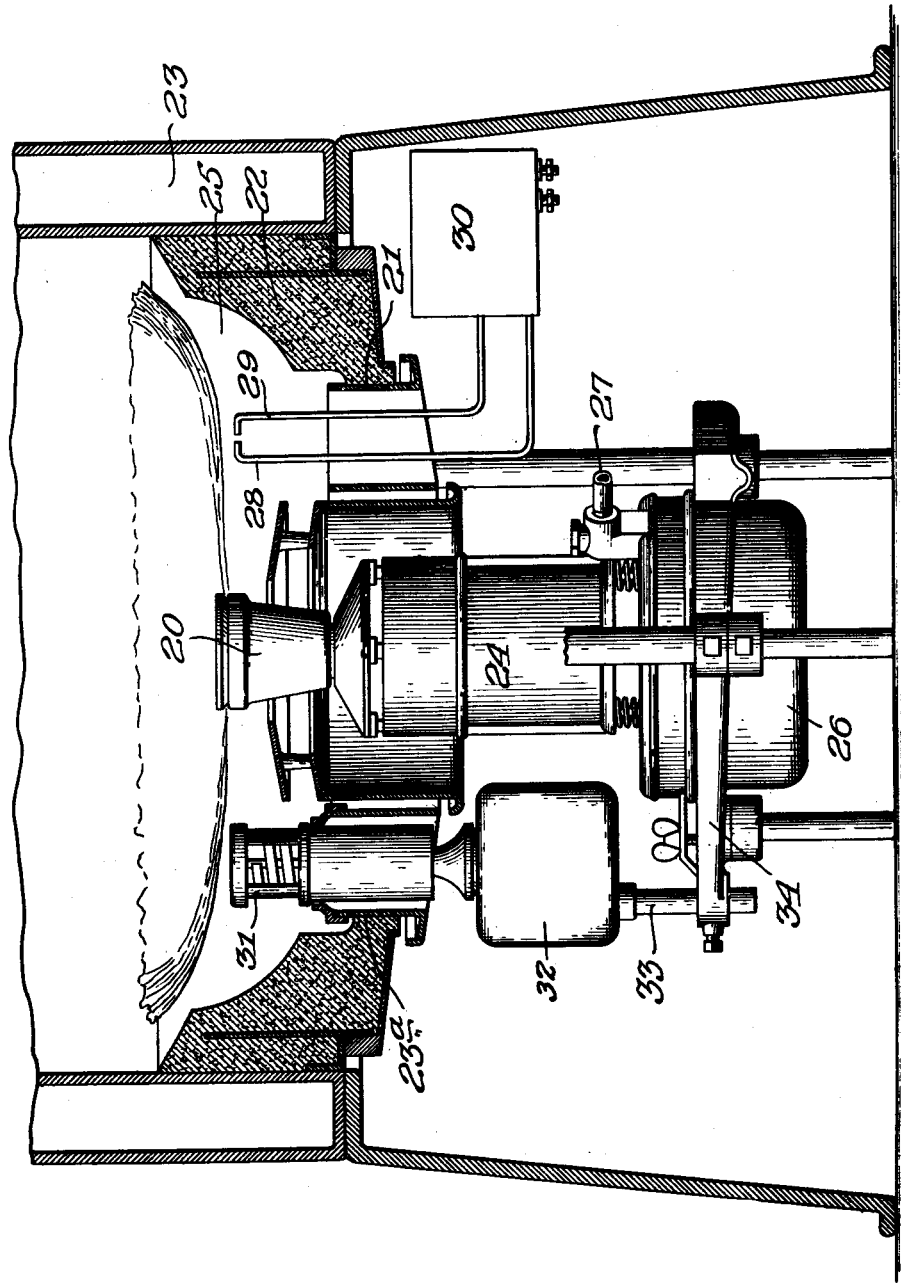
Inventor:
Stanley Perry,

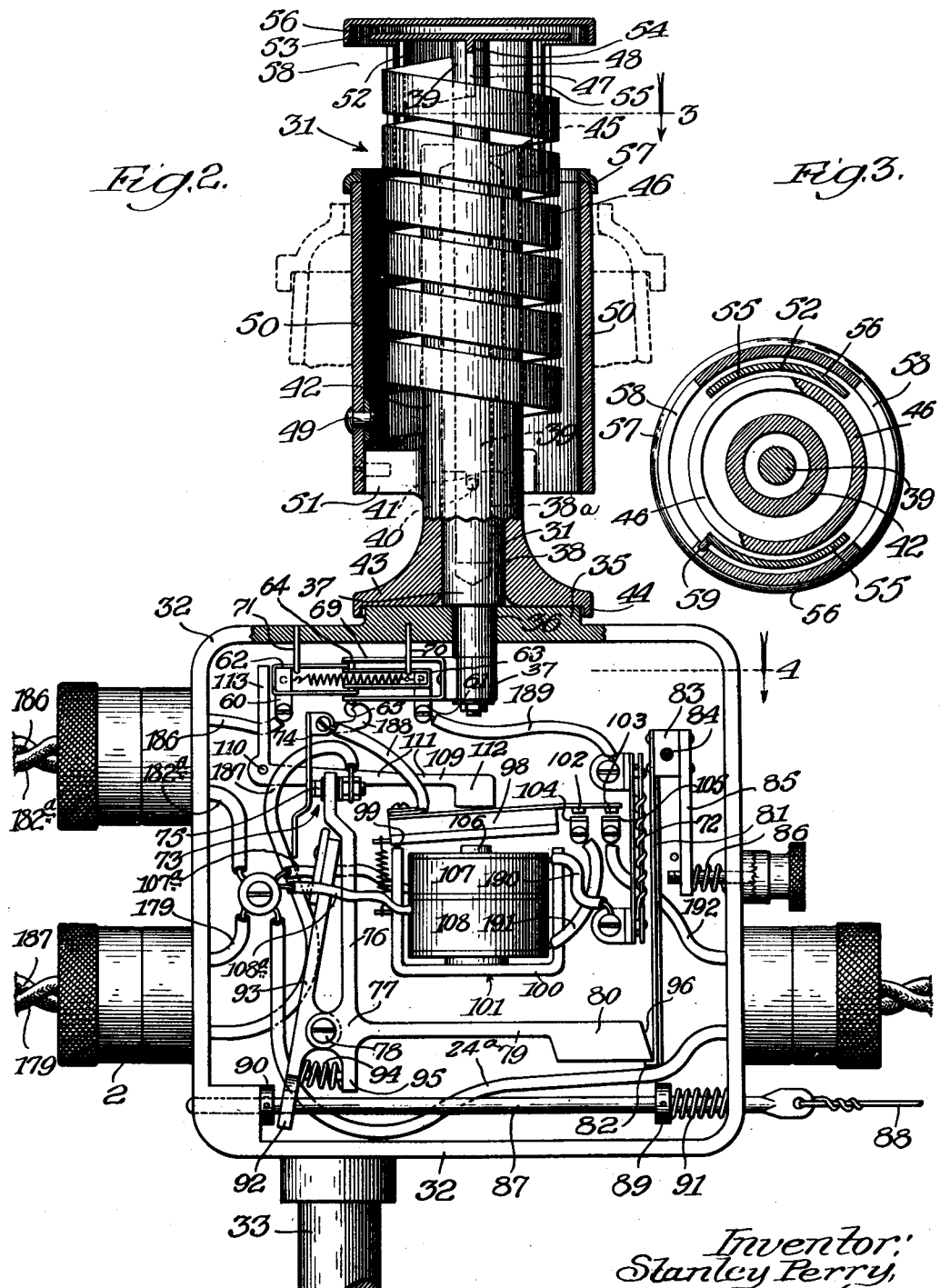

Nov. 25, 1930.  S. PERRY  1,782,937
CONTROLLING MECHANISM FOR OIL BURNERS
Filed April 21, 1928  9 Sheets-Sheet 3
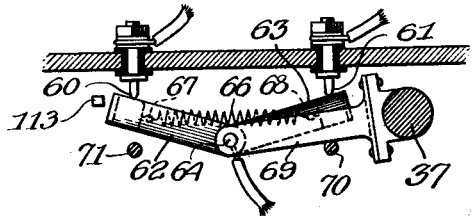
Fig. 4.
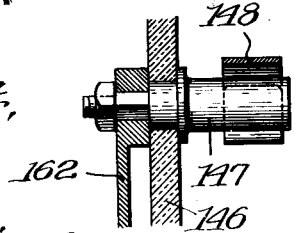
Fig. 4ª.
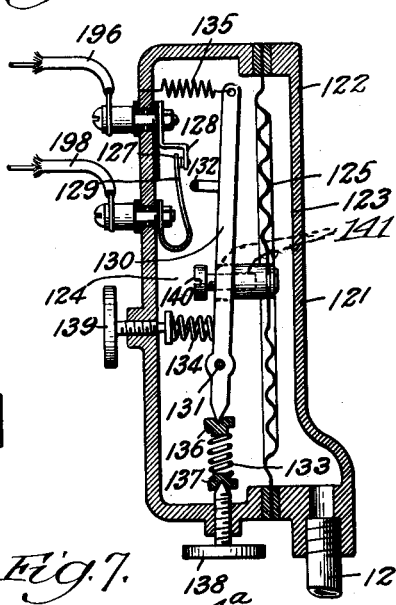
Fig. 5.
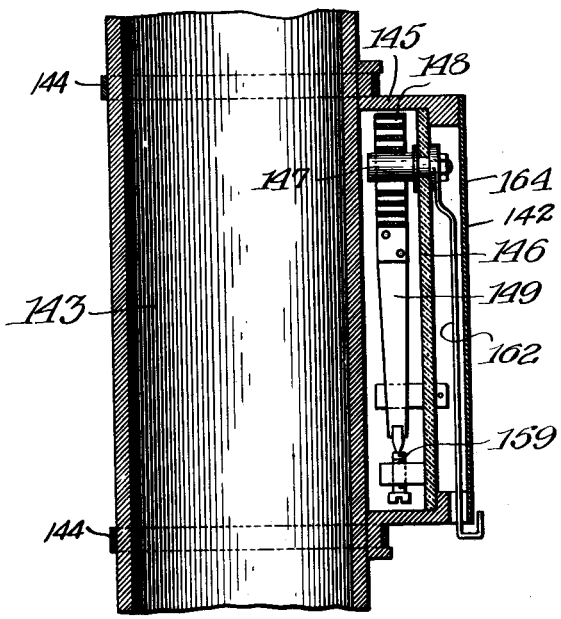
Fig. 6.
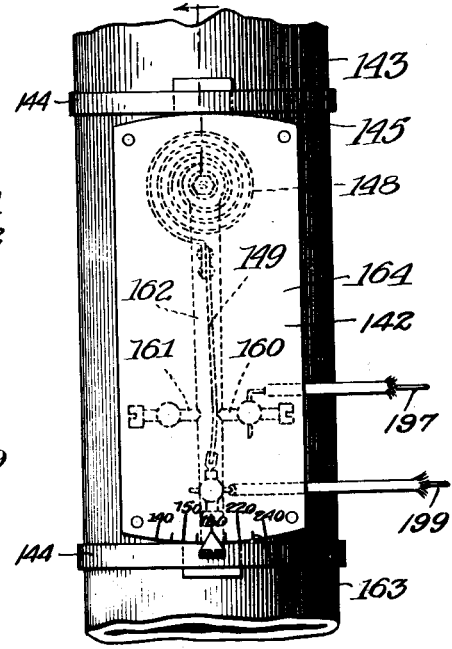
Fig. 7.
Inventor:
Stanley Perry,
By Dyrenforth, Lee, Chritton & Wiles
Attys.

Nov. 25, 1930.  S. PERRY  1,782,937
CONTROLLING MECHANISM FOR OIL BURNERS
Filed April 21, 1928  9 Sheets-Sheet 4
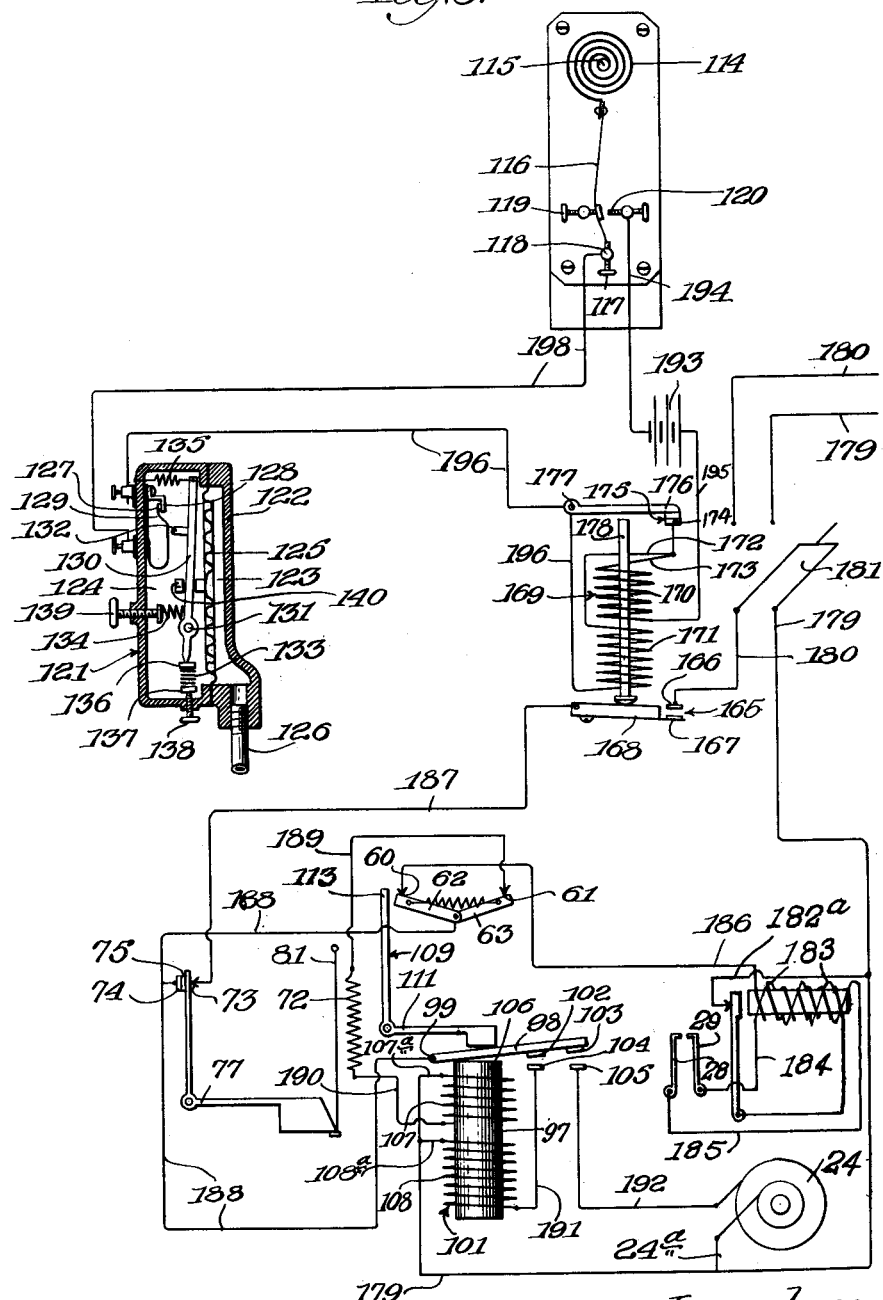

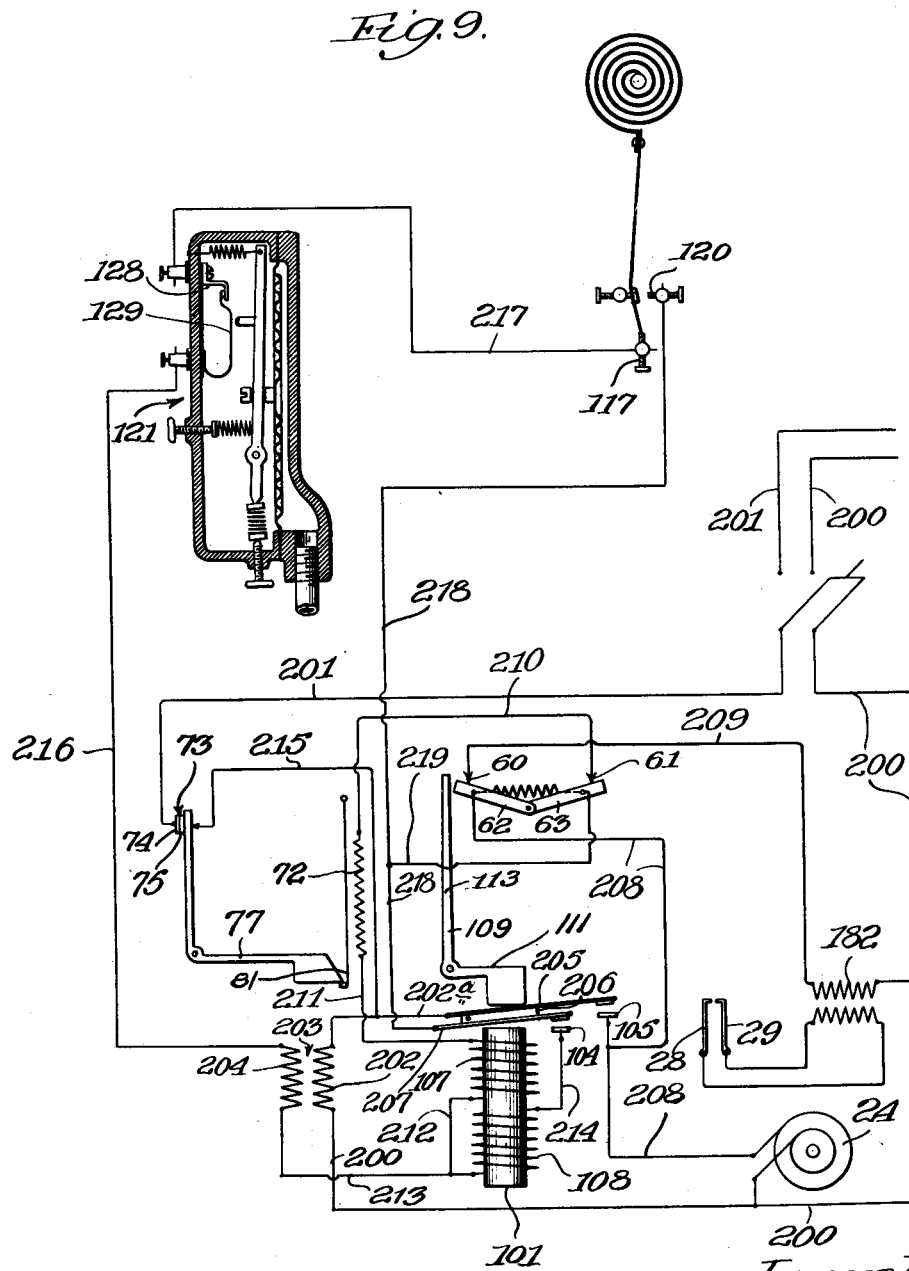

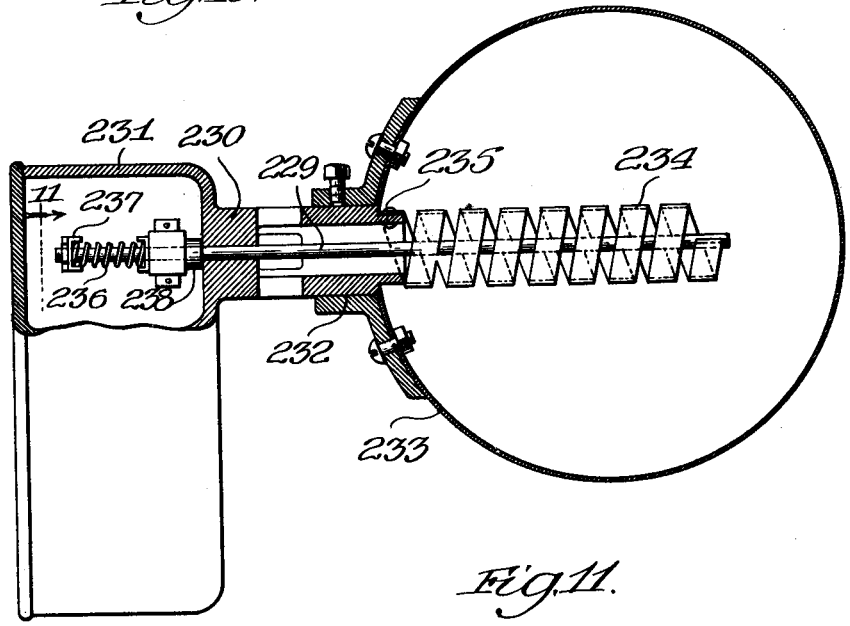
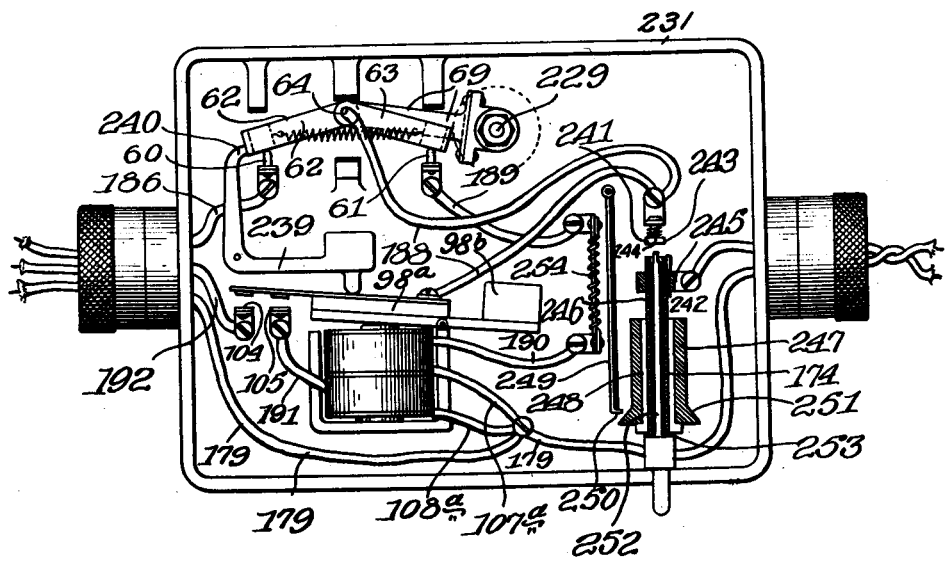

Nov. 25, 1930.  S. PERRY  1,782,937
CONTROLLING MECHANISM FOR OIL BURNERS
Filed April 21, 1928   9 Sheets-Sheet 7
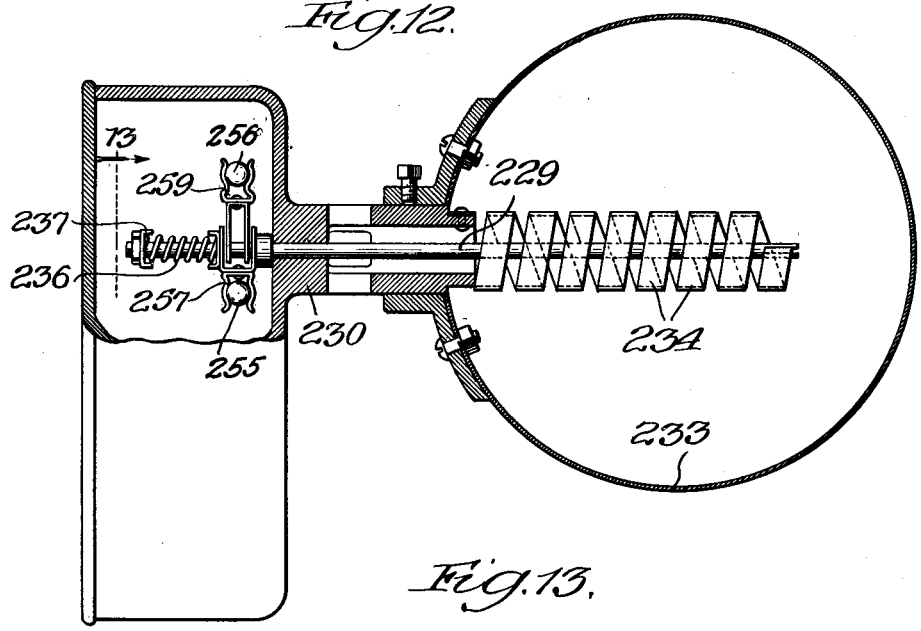
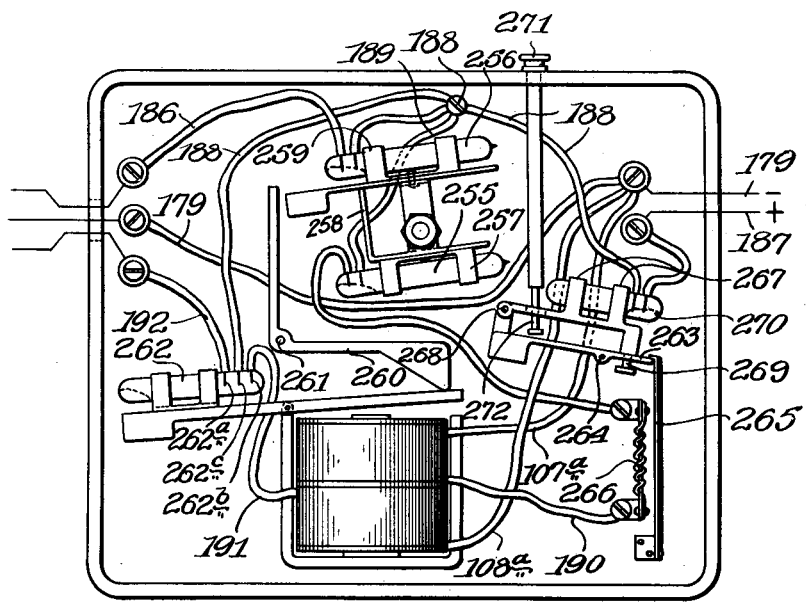

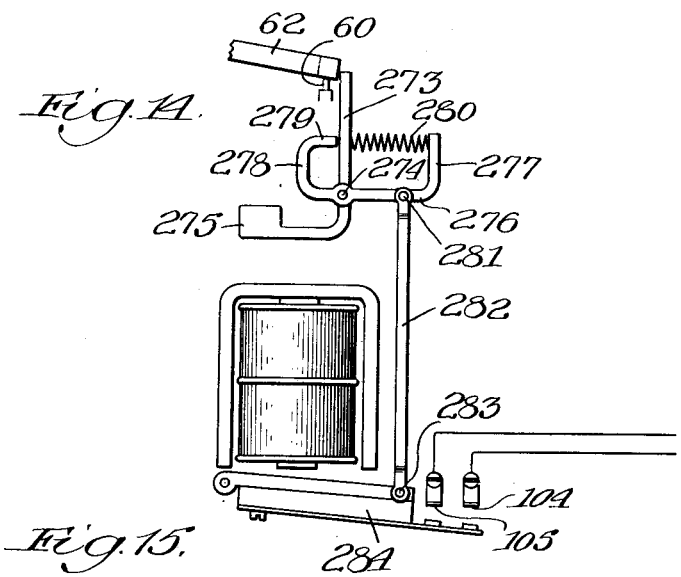
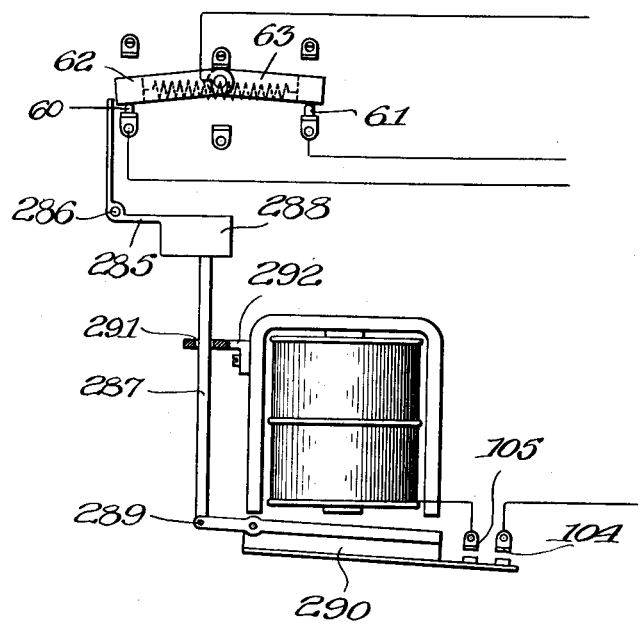

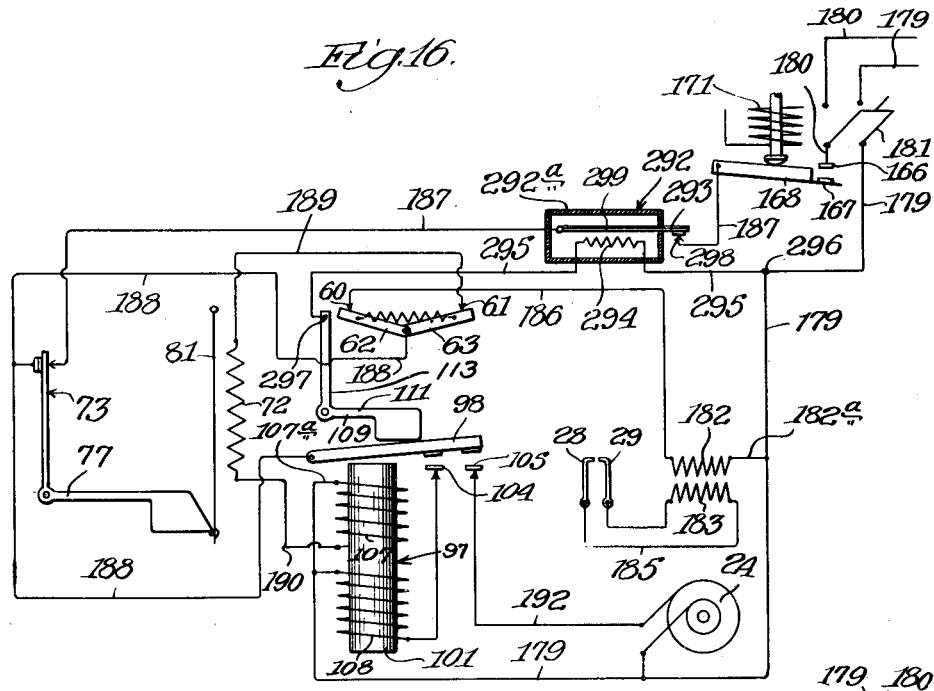
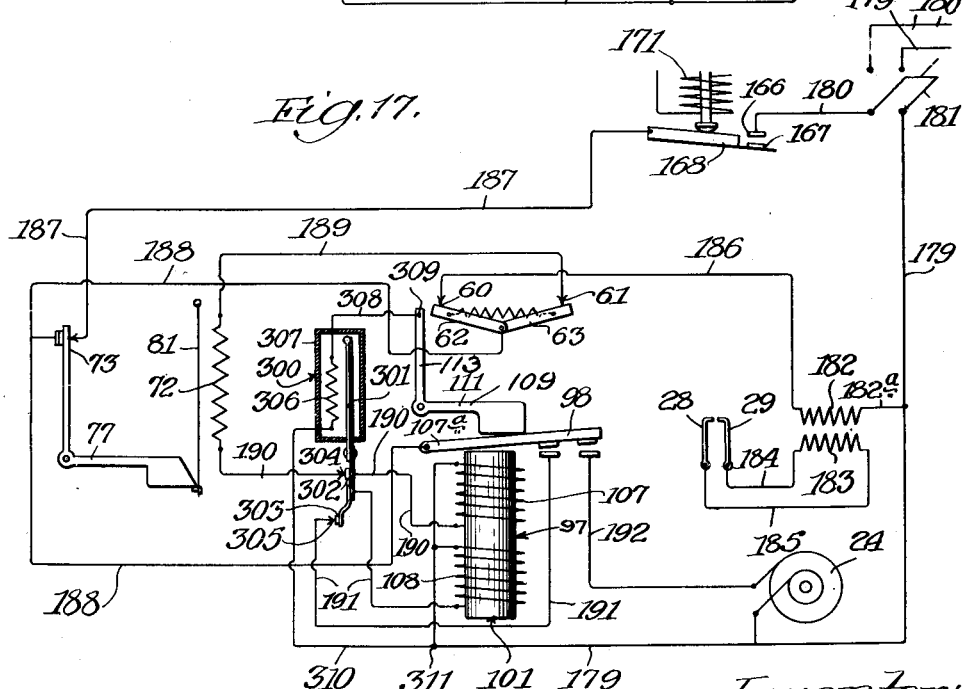

Patented Nov. 25, 1930

1,782,937

UNITED STATES PATENT OFFICE

STANLEY PERRY, OF CHICAGO, ILLINOIS, ASSIGNOR TO AUTOMATIC BURNER CORPORATION, OF CHICAGO, ILLINOIS, A CORPORATION OF ILLINOIS

CONTROLLING MECHANISM FOR OIL BURNERS

Application filed April 21, 1928. Serial No. 271,837.

My primary object is to provide improvements in electrical controlling mechanism for oil burners, to the end that danger in the operation of the apparatus will be reduced to the minimum, if not entirely overcome.

More specifically stated, certain of my objects are as follows:

To avoid possibility of the ignition of explosible gas in a furnace equipped with the burner and which if the same were ignited would produce an explosion liable to result in damage;

To provide improvements to the end that the discharge of oil from the burner be substantially simultaneous with the production of a gas-igniting flame or spark, which ensures ignition of the fuel substantially simultaneous with the discharge from the burner, thereby avoiding explosions which sometimes occur in furnaces equipped with oil burners of such construction that the discharge of oil from the burner may take place independently of the conditioning of the igniter means;

To provide improvements to the end that should the flame become extinguished and oil continue to be supplied to the furnace, the operation of the mechanism of the burner will be automatically discontinued and operation of the igniter means prevented until after the discontinuance of the oil-supplying means;

To provide improvements to the end that should the flow of current to the burner-motor cease even momentarily, it will be impossible to start the flow of oil through the burner without producing simultaneous, or substantially simultaneous, ignition thereof;

To provide improvements to the end that should the burner, for any reason, after the current has been turned on, cease to supply oil to the burner, the operating mechanisms of the burner will automatically cease to operate and require a manual-resetting operation to condition the mechanisms for automatic operation and upon re-establishing the flow of oil from the burner by re-establishing the operation of the mechanism which supplies the oil, the oil-ignition means will be automatically started into operation simultaneously, or practically simultaneously, therewith;

To provide against the ignition of vapor or gas which may become generated in the combustion chamber as in the event of a momentary failure of fuel resulting in extinguishment of the flame at the burner;

To provide relatively compact and inexpensive mechanism for accomplishing the above stated purposes; and other objects as will be manifest from the following description.

Referring to the accompanying drawings in which I have chosen to illustrate my invention as applied to a burner of the type comprising a motor which operates to discharge the oil from the burner into a furnace to be heated:—

Figure 1 is a view in elevation, with certain parts sectioned, of the lower portion of a furnace structure equipped with a burner of the type referred to controlled by mechanism embodying my invention.

Figure 2 is a view in side elevation, with the cover plate removed and certain parts sectioned, of heat-controlled mechanism constituting a part of the burner-controlling mechanism and in use being located where it is subjected to the heat generated by the flame of the oil burner to be controlled.

Figure 3 is a plan sectional view taken at the line 3 on Fig. 2 and viewed in the direction of the arrow.

Figure 4 is a plan sectional view of one of the switch devices and its operating mechanism, constituting a part of the structure of Fig. 2, this view being taken at the line 4 on Fig. 2 and viewed in the direction of the arrow.

Fig. 4ª is a cross sectional view showing a detail of the boiler-thermostat, the section being taken at the line 4ª on Fig. 7 and viewed in the direction of the arrow.

Figure 5 is a view in side elevation of a boiler-controlled switch forming a part of the illustrated controlling mechanism.

Figure 6 is a broken view in vertical sectional elevation of one of the water pipes leading from a hot-water boiler and provided with a heat-controlled switch-device also shown in vertical section and forming a part of the illustrated controlling mechanism.

Figure 7 is a view in elevation of the structure shown in Fig. 6, the view being taken from the right-hand side of this figure.

Figure 8 is a view in the nature of a diagram showing the various mechanisms illustrated in the preceding figures and the circuit connections therefor according to one circuit arrangement which may be employed.

Figure 9 is a view in the nature of a diagram showing certain of the various mechanisms illustrated in the preceding figures and the circuit connections therefor according to another circuit arrangement which may be employed.

Figure 10 is a plan view of another construction of control mechanism similar, in purpose, to the control mechanism of Fig. 2, but adapted for use in the stack of a furnace equipped with the burner to be controlled.

Figure 11 is a view in elevation of the mechanism of Fig. 10, this view being taken at the line 11 on Fig. 10 and viewed in the direction of the arrow.

Figure 12 is a view like Fig. 10 of still another construction of control mechanism for use in the stack.

Figure 13 is a view like Fig. 11 of the mechanism of Fig. 12, the structure being viewed at the line 13 on Fig. 12 and in the direction of the arrow.

Figure 14 is a view, partly diagrammatic and in elevation, of a modification of the igniter-means-lockout mechanism showing it as applied to stack-controlled switch-mechanism.

Figure 15 is a view like Fig. 14 of another modification of the igniter-means-lockout mechanism; and Figures 16 and 17 are views in the nature of diagrams of other circuit arrangements in accordance with my invention.

By way of explanation of the construction, the particular arrangement shown contemplates the employment of an oil burner as for example of the type which is controlled by an electric motor and which may be of the type above referred to and as disclosed in U. S. Letters Patent No. 1,505,607 granted August 19, 1924, and by way of explanation of the construction of this burner it will be sufficient, for the present application, to state that the burner head represented at 20 and which extends upwardly through a central opening 21 in the bottom 22 of the furnace 23, is mounted upon the upper end of the armature shaft of a vertically disposed motor 24, to be driven thereby and spray laterally outwardly into the bottom portion of the chamber 25 of the furnace, oil delivered thereto through the armature shaft, by virtue of the rotation of the latter, this shaft extending downwardly into a receptacle 26 to be fed with oil therefrom and supplied to the receptacle in any suitable way through a pipe 27, it being understood that oil is discharged into the chamber 25 through the burner, only when the motor is running, the motor being supplied with current as hereinafter described.

Located to one side of the burner proper are electrical igniter means comprising two electrodes 28 and 29 which extend upwardly into the chamber 25 and are spaced apart to present a spark gap, these electrodes being supplied with current to produce sparking at this gap, by electrical mechanism represented generally at 30.

Also at a side of the burner 20 is heat-controlled electrical mechanism represented generally at 31 and provided as controlling means for the mechanism hereinafter described and shown as extending upwardly through a lined opening 23ª in the bottom of the furnace, into the combustion chamber 25.

The mechanism 31, according to the particular construction shown in Figures 1, 2, 3, 4 and 8, comprises a casing 32 shown as supported by a post 33 rising from the frame 34 of the oil-burner structure, the top side of the casing 32 being provided with an upwardly-extending circular boss 35 containing a centrally-disposed opening 36 opening into the interior of the casing 32. Journalled in the opening 36 is a shaft section 37, the upper portion of which is of enlarged diameter and presents a shoulder 38 at which this shaft engages the upper surface of the boss 35, this shaft section containing an upwardly-opening socket 38ª. Extending at its lower end into the socket 38 is a shaft section 39 carrying a transversely extending pin 40 positioned within diametrically-opposed slots 41 in the upper end of the shaft section 37. Surrounding the shaft sections 37 and 39 is a sleeve 42 having an expanded base portion 43 at which it rests upon the upper surface of the boss 35, the base 43 being provided with an annular depending flange 44 overlapping the sides of the boss 35.

Loosely surrounding the upper end portion of the sleeve 42, the opening in the upper end of which and represented at 45 is restricted to form a journal for the upper end of the shaft section 39, is a thermostatic element 46 in the form of a spiral coil, or helix, the upper end of which, deflected as represented at 47, extends into a slot 48 in the shaft section 39, the lower end of the thermostatic element 46, being rigidly secured, as by a rivet 49, to a tubular member 50 open at its upper and lower ends and supported on arms 51 carried by, and radiating from, the sleeve 42.

The member 50 extends concentrically of the thermostatic element 46 and is spaced therefrom as shown. The thermostatic element 46 is of bimetallic construction as is the case of thermostatically-controlled devices as commonly provided. When subjected to heat it moves at its free upper end in a direction to tighten the coil thereby rotating the shaft sections 37 and 39 in clockwise direction in Fig. 4, and when cooled it uncoils and rotates the shaft sections in the opposite direction, the weight of the sleeve member 42 and the parts carried thereby being such that sufficient friction exists between the head 43 and the boss 35 to prevent turning of the sleeve 42 in the coiling and uncoiling of the thermostatic element to degrees sufficient to actuate the switch mechanism hereinafter described and actuated by the shaft 37. In other words, the head 43 and boss 35 co-act to form a friction clutch which ensures the operation of the switch referred to, and provides for the desired slippage between the sleeve 42 and boss 35 should the thermostat continue to coil or uncoil, as the case may be, following the actuation of the switch referred to.

The thermostatic element 46 extends into the combustion chamber 25 wherein it is subjected to the more or less intense heat generated by the burner and it is therefore desirable to provide means which, while presenting no obstruction to the transmission of heat from the flame at the burner to the thermostatic element upon initial combustion in the furnace, will become automatically positioned for shielding the thermostatic element from such heat after the switch controlled by this thermostatic element has operated.

These means in the construction shown comprise a shutter element 52 shown as formed of an upper cross piece 53 supported on the upper end of the shaft section 39 and provided with a depending lug 54 extending into the slot 48 to form a driving connection between the shutter 52 and this shaft section. The ends of the cross piece 53 are provided with depending, diametrically opposed, plate portions 55 of arcuate shape, as shown, located at opposite sides of the thermostatic element 46 and extending downwardly into the tubular member 50.

These protecting means also comprise a hollow cylindrical member 56 having its upper end closed and rotatably seated at its lower, open, end upon the upper edge of the member 50, a depending annular flange 57 on the member 56 and overlapping the walls of the member 50 holding the member 56 in vertical alignment with the member 50. The side wall of the member 56 is diametrically slotted as indicated at 58, a pin 59 projecting radially outwardly from one of the arms 55 extending into one of the slots 58.

The arrangement of the parts just described is such that in the cold condition of the furnace the shutter device 52 is open as shown. When combustion is taking place in the furnace heat passes through the openings 58 and heats the thermostatic device 46 causing it to rotate in clockwise direction in Fig. 3 as hereinbefore stated which rotates the shutter device 52 in the same direction to move it to a position in which it closes the openings 58 which should not occur until after the switch actuated by the shaft sections 37 and 39 has been operated. In the event that the heat in the furnace is sufficient to continue to coil the thermostatic element after the switch has been operated and the shutter device closed, the pin 59 in engaging the end wall of the slot 58 rotates the member 56 therewith, the shutter remaining closed. In the cooling of the thermostatic element 46, the shutter device moves to open position and should the thermostatic element continue to uncoil beyond the position in which the shutter is fully open, the pin 59 will engage the opposite wall of the slot 58 and rotate the member 56 while maintaining the shutter open.

The heat-switch mechanism operatively connected with the shaft 37—39 and hereinbefore referred to, comprises a pair of stationary contacts 60 and 61 located on the inside of the casing 32, and a pair of movable contact links 62 and 63 which cooperate at their outer ends with these stationary contacts, respectively, these links which are shown as in the form of yokes nested together at their inner ends, being pivotally connected together by pivots 64 and 65, a coil spring 66 being connected at its opposite ends, as represented at 67 and 68, to the links 62 and 63 adjacent the outer ends of the latter.

The heat-switch mechanism also comprises an arm 69 rigidly secured to the lower end of the shaft section 37, its outer end being bifurcated at which portion it straddles the links 62 and 63 at their pivotal connection, the pivots 64 and 65 being carried by and extending through the arms of the yoke of the member 69.

It may be here stated that in the cold condition of the furnace the parts of the heat-switch now being described extend in the position shown in Fig. 4 in which the spring 66 serves to yieldingly press the contact links 62 and 63 against the fixed contacts 60 and 61, respectively. Heating of the thermostatic device and consequent rotation of the shaft section 37 in clockwise direction in Fig. 4 shifts the pivots 64 and 65 across and beyond the median line of the spring 66, whereupon this spring operates to swing the link 63 in a direction away from the contact 61 and into engagement with a stop 70 on the casing 32, and the link 62 away from the fixed contact 60 and into engagement with the stop 71.

The electrical mechanism also comprises a time switch which may be of any suitable construction, that shown being located within the casing 32 and comprising a heating coil 72 adapted to be heated by the passage of current therethrough; a switch device represented generally at 73 and comprising a stationarily supported spring contact finger 74 and a contact 75 carried by one arm 76 of a bell-crank lever 77 fulcrumed on a stationary pivot 78, the other arm 79 of this lever being weighted as indicated at 80 and extending substantially horizontally; and a thermostatic element 81 cooperating with the coil 72 and the switch 73.

The thermostatic element 81 of the time-switch is preferably formed of two flatwise opposed strips of metal having different coefficients of expansion and is positioned lengthwise of, and closely adjacent to, the coil 72. In the normal, cool, condition of the element 81 it extends into the position shown in Fig. 2 in which it forms, at a shoulder portion 82, a support for the arm 79 in which position of the arm the switch 73 is closed. The parts are so arranged that when the thermostatic bar 81 becomes heated to a predetermined degree it deflects at its lower end to the right in Fig. 2 sufficiently to disengage from the arm 79 and thereby permits the bell crank lever 77 to rock in clockwise direction in Fig. 2 to a position in which the contacts 74 and 75 are separated thereby breaking the circuit through the device.

To provide for the proper setting of the thermostatic element 81 relative to the coil 72 and bell crank lever 77, the bar 81 is mounted at its upper end on a block 83 which is pivoted on a horizontal stud 84 carried by the casing 32, the block 83 having an arm 85 operatively engaging a spring adjusting device 86 of a well known construction and operating to rotatably adjust the block, and the parts carried thereby, on the pivot 84.

It may be here stated that the time-switch 73, together with the thermostatic control therefor as described, is provided as a means for automatically discontinuing the supplying of current to the motor 24 in the event that the oil does not ignite in the starting of the motor 24 or the flame becomes extinguished at the burner while the circuit connections of the controlling apparatus are in a condition in which the circuit in which the motor 24 is interposed, is closed. When this switch is thus operated it remains in open condition during which time the motor circuit is broken, until manually reset, which is effected in the construction shown by the mechanism comprising a manually-operable rod 87 slidable in the casing 32 and connected with a pull wire 88 extending to an accessible point outside of the furnace. The rod 87 carries collars 89 and 90 fixed thereon and is spring pressed to the left in Fig. 2 by a coil spring 91 surrounding this rod and confined between the collar 89 and a side wall of the casing 32.

The other collar 90 is positioned to cooperate with the lower bifurcated end 92 of a lever 93 mounted on the pivot 78, when the rod 87 is shifted to the right in Fig. 2 in the switch-resetting operation. A coil spring 94 confined between the end 92 of the lever 93 and a depending lug 95 on the bell-crank lever 77 serves to rock the bell crank lever 77 to the position shown in Fig. 2 when the rod 87 is actuated as stated. The terminal end of the weight 80 is beveled as represented at 96 for the purpose of effecting the automatic interlocking of the thermostatic bar 81 at its shoulder 82 with the bell crank lever 77 when the latter is rocked to the reset position.

The lever 93 extends upwardly into a position in which, when it is operated by the rod 87 as stated, it engages the free lower end of the flexible contact 74 flexing the latter to a position in which it is out of engagement with the contact 75 when the bell crank lever 77 is moved, as stated, to the position shown in Fig. 2. As soon, however, as the operator releases tension on the pull wire 88 the spring 94 rocks the arms 93 to the position shown in Fig. 2, permitting the contact 74 to flex into engagement with the contact 75 thereby closing the circuit. The mechanism just described is provided as a means of ensuring against the operator locking the bell crank lever 77 in circuit-closing position and rendering the time release means referred to inoperative, as for example by drawing on the wire 88 and tying it against return to normal position.

The electrical mechanism also comprises a relay-controlled switch by which the current to the motor 24 is directly controlled and through the medium of which the igniter means above-referred-to are controlled to prevent the operation of the latter while the motor 24 is discharging unignited fuel into the combustion chamber. This mechanism is shown as comprising a double switch device formed of a contact lever 98 pivotally supported at 99 on the frame 100 of a relay device 101, and forming the armature of this relay.

The outer end of the contact arm 98 is provided with a pair of contacts 102 and 103, electrically connected together, these contacts cooperating with stationary contacts 104 and 105, respectively, spaced apart and insulated from each other.

The relay 101 is formed of a core 106 in line with the armature 98, this core being surrounded by a "closing" or "pick-up" coil 107 and a "holding" coil 108, the "closing" or "pick-up" coil when energized moving the armature switch member 98 into engagement at its contacts 102 and 103 with the contacts 104 and 105; and the "holding" coil 108 when thereafter energized operating to hold the armature switch member 98 in switch-closing position.

The means by which the relay device 101 controls the igniter means comprise a bell crank lever 109 pivoted at its angle to the casing 32 as indicated at 110. The arm 111 of this lever extends substantially horizontally and is weighted as indicated at 112 at which portion it rests, by gravity, upon the armature 98. The other, vertical, arm 113 of this lever is so positioned relative to the link 62 that when the armature 98 is in raised position this arm will extend out of the path of movement of this link, but when this armature is actuated to switch-closing position, the arm 113 will extend into a position in which it will obstruct the swinging of the link 62, under the action of the spring 66, to a position in which it engages the fixed contact 60.

The arrangement shown also involves a room-thermostat which, by way of example, may be located in a room to be heated from the furnace equipped with the burner and which is provided to control the operation of the burner responsive to temperature changes in the room.

The form of thermostat shown and the use of which requires two wires only connected therewith, comprises a relatively stiff thermostatic coil 114 formed of two strips of metal flatwise opposed and having different coefficients of expansion, the inner end of this coil being rigidly connected with a stationary post 115 and its free end connected with a relatively flexible strip 116 of spring metal, the extremity of which bears endwise against an adjustable stop screw 117 secured in a stationary binding post 118, the coil 114 exerting pressure against the opposite end of this strip forcing it into the bowed condition shown in which it engages an adjustable stop device 119.

The condition of the thermostat just described is that which it assumes when the room is at the desired temperature, the coil 114, as the temperature of the room lowers, coiling and in such movement operating to cause the strip 116 to flex reversely to that shown in Fig. 8 whereupon, this strip disengages from the stop 119 and engages with the contact 120 at the opposite side of the strip and closes the circuit through the thermostatic device. When the temperature of the room reaches the desired predetermined degree the coil 114, in uncoiling, operates to flex the strip 116 back to the position shown in Fig. 8 with the result of opening the circuit through the thermostatic device. Thus the circuit is made and broken through the thermostatic device by a quick, snap, action.

The arrangement shown also comprises a so-called boiler-pressure control mechanism represented generally at 121 and provided for the purpose of automatically discontinuing the operation of the burner either in the event of the accumulation of pressure in the boiler heated by the burner above the predetermined degree when the boiler is a steam boiler, or the reduction of the vacuum in the boiler below a predetermined degree where the boiler is of the vacuum type, depending on the adjustment of the boiler pressure control mechanism.

The mechanism shown for this purpose comprises a casing 122 containing chambers 123 and 124 separated by a flexible diaphragm 125, and a pipe 126 communicating with the interior of the boiler and opening into the chamber 123. The chamber 124 contains a switch 127 formed of a stationary contact 128 and a spring contact 129, this switch being controlled by the diaphragm 125 through the medium of a lever 130 fulcrumed in the casing at 131. The lever 130 is arranged opposite the spring contact 129 and is provided with a lug 132 adapted to force the contact 129 out of engagement with the contact 128 when the pressure in the boiler exceeds a predetermined degree, or the vacuum in the boiler reduces to a predetermined degree, the lever 130 being shown as operatively engaged by three coil springs 133, 134 and 135. The coil spring 133 is confined between blocks 136 and 137, the block 137 being operatively engaged by an adjusting screw 138 and the block 136 receiving the lower pointed end of the lever 130, this spring tending to exert an upward thrust on this lever and operating to cause the latter to be moved in either direction by a snap action.

The spring 134 is confined between the lever 130 above the fulcrum 131 and an adjusting screw 139 and tends to rock this lever in clockwise direction. The spring 135 is a tension spring connected at its opposite ends with the casing and with the upper end of the lever 130, respectively, and tends to rock the lever 130 in counterclockwise direction on its pivot 131.

The lever 130 is operatively connected with the diaphragm 125 through the medium of a headed stud 140 which extends loosely through an opening 141 in this lever, whereby the lever 130 is rocked on its fulcrum responsive to the movement of the diaphragm 125.

The spring 135 is provided to function in case the boiler with which the burner controlled apparatus is used is of the vacuum type in which case the operator would release the tension of the spring 134 by means of the adjustment screw 139.

Where the boiler is a pressure boiler the spring 135 may or may not be omitted as desired, as it is a light spring, as compared with spring 134, and when present its resistance can be readily overcome by properly tensioning spring 134.

In Figs. 4ª, 6 and 7 I have shown an alternative thermostatic control to be used in place of the control mechanism 121 when the heater in connection with which the burner is used is a hot-water boiler. This mechanism which is provided to break the circuit of the motor 24 should the water in the boiler exceed a predetermined temperature, is represented generally at 142 and is shown as secured, as by means of strap clamps 144, to the side of one of the water pipes 143 leading from the hot water boiler.

This mechanism shown in detail in Figs. 4ª, 6 and 7 is of the same general construction as the room thermostat hereinabove described and comprises a casing 145 held in place by the clamps 144 with its rear side open. The casing contains a partition 146 in which a post 147, corresponding with the post 115 of the room thermostat, is supported for rotary adjustment. Surrounding the post 147 is a thermostatic element 148 like the element 114 of the room thermostat, the inner end of the coil of this element being rigidly connected with the post 147. The outer end of the coil is connected with a strip 149 of spring metal which bears at its lower end against an adjustable abutment 159 as in the case of the room thermostat. The metal strip 149 is located between an adjustable contact 160 and an adjustable stop device 161 as in the case of the room thermostat, the thermostatic coil when the temperature of the water in the pipe 143 reaches the desired predetermined degree, uncoiling and causing the strip 149 to disengage the contact 160 and engage the stop 161. The outer end of the stud 147 is provided with a depending pointer 162 cooperating with a temperature scale 163 on the front plate 164 of the device. By adjusting the pivoting stud 147 the device is adapted to make and break the circuit therethrough at different selected temperatures.

The arrangement shown in Fig. 8 contemplates the use of high voltage direct current supplied from line wires to the burner while the room thermostat, and the boiler-controlled mechanism 121, or the hot water controlled mechanism 142, are in a low voltage direct-current circuit, the current for which is supplied, by way of example, from a battery 193.

The high tension current circuit hereinafter described has interposed therein a switch represented generally at 165 and comprising a stationary contact 166 and a movable contact 167 in the form of an armature 168 which forms an element of a relay device 169. The relay device comprises two windings one of low resistance and represented at 170 and made of relatively heavy wire, and the other of high resistance and represented at 171 and made of relatively fine wire and having many times the number of turns than in the case of the coil 170, the terminal 172 of the coil 171 being connected with the terminal 173 of the coil 170 and both connected with a stationary contact 174 of a switch device 175, the other contact 176 of which is in the form of a lever pivotally supported at 177 and so arranged as to be self-closing. The relay 169 also comprises a rod 178 located within the windings 170 and 171 and free to move up and down therein, this rod resting at its lower end upon the armature 168 and of such length that it engages the contact 176 and breaks the current at the switch 175, when the armature 168 is lifted to circuit-closing position.

Referring now to the various circuit arrangements shown in Fig. 8, the line, or service, high voltage direct current wires are represented at 179 and 180 with a hand-throw switch 181 interposed therein. The wire 179 connects, by wire 107ª, with one of the terminals of the closing coil 107, by wire 108ª, with one of the terminals of the holding coil 108, by wire 24ª, with one of the terminals of the motor 24, and, by wire 182ª, with one of the terminals of the primary coil 182 of a D. C. spark coil the secondary of which is indicated at 183 and is in circuit with the igniter terminals 28 and 29 through the wires 184 and 185. The other terminal of the primary 182 connects, by a wire 186, with the contact 60.

The wire 180 connects with the stationary contact 166 of the switch 165, the movable contact 167 of which connects by a wire 187 with the movable contact 75 of the switch 73, with the stationary contact 74 of which is connected with a wire 188 which leads from the contact links 62 and 63 to the switch lever 98.

The contact 61 with which the contact link 63 cooperates, is connected by a wire 189 with one end of the heating coil 72, the opposite end of this coil being connected by a wire 190, with the end of the closing coil 107 opposite that which is connected with the wire 179. A wire 191 connects the stationary contact 104 of the motor switch, with the end of the coil 108 opposite that connected with the wire 108ª. A wire 192 connects the stationary contact 105 of the motor switch with the terminal of the motor 24 other than the one connected with the wire 24ª.

Referring now to the low voltage circuit and in which the room thermostat and the boiler controlled switch device 121, or the hot water controlled device 142, as the case may be, is interposed, the source of low voltage current, shown as the battery 193, is connected, at one of its terminals, by a wire 194, with the contact 120 of the room thermostat, the other terminal of this battery being connected, by a wire 195 with the end of the coil 170 other than that connected with the coil 171. A wire 196 connects with the other terminal of the coil 171 and with the movable contact member 176 and also with the contact 128 of the boiler-controlled mechanism 121. The contact strip 116 connects, by a wire 198, with the movable contact 129 of the control mechanism 121. Where the hot-water-controlling device 142 is used in place of the device 122, the wire 196 would be connected with the contact 160 of the device 142 by a wire 197 and the wire 198 with the contact strip 149 of device 142 by a wire 199.

The various parts of the apparatus shown are represented in the condition they assume when the temperature in the room equipped with the room thermostat is such that operation of the burner is not desired; and the pressure in the boiler is below the maximum pressure, or the vacuum in the boiler, as the case may be, is above the minimum vacuum to be attained in the boiler, and the temperature of the water in the system supplied from the boiler is below the maximum to be attained.

In such condition of the apparatus, assuming the switch 181 to be closed, no current is being supplied to either the high voltage or low voltage circuits as the switch 165 and the switch of the room thermostat, are open.

When the temperature in the room equipped with the room thermostat, lowers below a predetermined degree, the coil 114 of the room thermostat coils and buckles the strip 116 out of engagement with the stop 119 and into engagement with the contact 120 thereby causing current to flow from the battery through wire 195, coil 170, switch 176, wire 196, to the switch device 121 or 142, as the case may be, and thence through wire 198 to strip 116, contact 120 and wire 194 to battery. The circuit thus established energizes the closing, or pick-up, coil 170 which attracts the armature 168 closing the switch 165 and at the same time, through rod 178, opening switch 175, the opening of switch 175 compelling the current to traverse both coils 170 and 171, the switch 165 remaining closed until the circuit is broken either at the room thermostat or at the device 121 or 142, as the case may be.

Closing of the switch 165 causes high voltage current to flow from the wire 180 through switch 165, wire 187, switch 73, wire 188 to contact levers 62 and 63, from which the current branches, current flowing through contact 61, wire 189, heating coil 72, wire 190, pick-up coil 107, wire 107ª and thence to wire 179; and also from the switch lever 62 through contact 60, wire 186, primary 182 of the igniter-means-spark coil, wire 182ª, and thence to wire 179. The circuits thus established energize the igniter means and also the relay 101, the energization of which latter depresses the armature contact member 98 closing the circuit between the contacts 102 and 104, and 103 and 105.

Thus operating the contact lever 98 closes the circuit through the motor 24, the circuit established being as follows: Through line wire 179, wire 24ª, motor 24, wire 192, contact 105, contact-lever 98, wire 188, switch 73, wire 187, switch 165, and wire 180.

The operation of the contact lever 98 as stated also closes a circuit as follows: Wire 179, wire 108ª, winding 108, wire 191, contacts 104 and 102, contact-lever 98, wire 188, switch 73, wire 187, switch 165, and wire 180, for energizing the winding 108 for maintaining the contact lever 98 in switch-closing position following the breaking of the current through the winding 107 as hereinafter described.

The burner motor 24 having been set into operation, it causes oil to discharge into the furnace, the oil becoming ignited by the igniter means 28—29 and the furnace is thus put into operation.

The thermostatic means 31, being positioned as above described, the thermostatic element 46 is subjected to the heat generated by the burning oil whereupon the coil 46 becomes more tightly coiled and rotates the shaft 37 in clockwise direction in Fig. 4 resulting in the swinging of the links 62 and 63 (Fig. 4) out of engagement with the respective contacts 60 and 61 and against the stops 70 and 71, thereby breaking the circuit in which the transformer 182—183 is located which de-energizes the igniter means 28 and 29, and also breaking the circuit through the heating coil 72 and the pick-up coil 107.

A circuit having been established through the holding-coil 108, as hereinbefore described, the contact member 98 remains in circuit-closing position so that current continues to flow to the motor until failure of supply of fuel to the burner or failure of current through the coil 108 which may result either from temporary interruption of flow of current through the line wires, or by the opening of the switch 165 by the breaking of the circuit at the room thermostat or at the control mechanism 121 or 142, as the case may be.

In the operation of the thermostatic element 46 as just described, the shutter device 55 rotates with the shaft 37 to a position in which the openings 58 in the casing 56 are closed thereby protecting the thermostatic element 46 against impairment by the intense heat at the burner.

Should the flow of oil to the burner cease or, for any reason, the burner fail to discharge oil into the furnace and failure of ignition thereof occurs, the apparatus will operate automatically to shut off the flow of current to the motor 24; and should the flow of current to the motor be momentarily discontinued, as for example by someone opening, even momentarily, a switch in the line, or by a temporary interruption in the line current, no current will flow to the burner motor, unless and until, the means for energizing the igniter means are rendered operative to ignite the oil discharged by the burner in the beginning of the operation of the motor.

The apparatus is rendered capable of operation as stated by reason of the provision of the heat control mechanism 31 which is responsive to variations in temperature in the combustion chamber and which in a comparatively short time, following the extinguishment of the flame at the burner, assumes circuit-closing position and in doing so closes the circuit through the coil 72, the current continuing to traverse this coil until the thermostat member 81 has become sufficiently heated by the coil 72 to deflect to a position in which it releases the bell crank switch lever 77 whereupon the latter drops to circuit-breaking position resulting in the breaking of the circuit to the motor 24 and the supplying of current to the coils 107 and 108, whereupon the relay 101 becomes de-energized and the contact lever 98 moves to circuit-opening position, it being understood that the bell crank lever 77 requires to be hand set, by the mechanism shown in Fig. 2 to again close the circuit therethrough after the thermostat member 81 has cooled sufficiently to position it for holding the bell crank switch lever 77 in the circuit-closing position shown in Figs. 2 and 8.

Should the flow of current to the motor be momentarily arrested, coil 108 becomes de-energized and switch 98 opens and breaks the motor circuit and it is impossible for the motor to again start into operation until the switch device 31, in the cooling of the thermostat element 46, returns to circuit-closing position (Fig. 4) whereupon the igniter means are caused to simultaneously operate with the burner motor, following the resumption of the supplying of current to the apparatus.

One of the principal features of my invention is the provision of means which become automatically positioned in the closing of the circuit at the switch of relay, to prevent the energization of the igniter means while this switch is closed and the motor 24 is operating.

It sometimes happens in the operation of a burner that because of a failure, otherwise than a current failure, the flame becomes extinguished, as for example through a momentary stoppage of the fuel flow, or the failure of the air supply to the burner, and that such failure corrects itself before the heat switch has cooled down sufficiently to reestablish the circuit for the igniter means, in which event the oil in discharging into the hot combustion chamber becomes gasified and the resultant gas explodes where the ignition means are energized subsequent to reestablishment of the oil flow.

The means last referred to comprise the lockout lever 113 of bell-crank 109 controlled by the armature 98 and the spring-connected contact links 62 and 63 of toggle-like character actuated by the arm 69 of the burner-controlled thermostatic device.

It will be noted that when the switch controlled by the relay 101 closes, the lockout lever 111 automatically rocks at its upper end into a position in which it obstructs the swinging of the contact link 62 into engagement with the contact 60 upon the movement of the arm 69 to the position shown in Fig. 4, this lockout lever remaining in obstructing position until the contact arm 98 in moving to motor-circuit-opening position rocks this lever out of locking position, whereupon the contact link 62 springs into engagement with the contact 60. Thus the igniter means cannot be energized until the time-switch has opened and thereafter manually reset.

It will be understood, however, that in the normal operation of the apparatus wherein the opening and closing of the motor circuit is effected by the room thermostat or the boiler controlled device or the hot water controlled device, the lockout lever 111 has a mere idling movement inasmuch as it is swung back to the normal position shown in Figs. 4 and 8 before the flame controlled thermostatic means operate to return the links 62 and 63 to circuit-closing position.

It will, of course, be understood that should, for any reason, the motor in starting fail to discharge oil into the furnace, or should ignition fail to take place, following the closing of the switch 165, the switch mechanism 31 will remain in circuit-closing position, thereby maintaining a flow of current through the heating coil 72 which operates, following the lapse of a predetermined length of time, to heat the thermostatic member 81 and effect the breaking of the circuit at the switch 73 and thus open the motor circuit.

Referring to the circuit arrangements illustrated in Fig. 9, those of the mechanisms which correspond with the mechanisms shown in the circuit arrangement in Fig. 8 being given the same designating numerals, the circuit arrangement shown represents an arrangement wherein the low-voltage current is supplied from a source of alternating current through a transformer. The line wires of a source of alternating current are shown at 200 and 201, the line wire 200 connecting with one terminal of the primary 182, one terminal of the motor 24 and with one terminal of the primary 202 of a transformer 203, the secondary coil of which is represented at 204. The other terminal of the coil 202 connects, by a wire 202$^a$, with a contact strip 205 of an armature 206 corresponding with the armature 98 and having a second contact strip 207 insulated from the strip 205, the strips 205 and 207 being provided for cooperation with the contacts 105 and 104, respectively.

The contact 105 connects, by a wire 208 at one end, with the other terminal of the motor and at its other end with the contact link 62, the links 62 and 63 in this arrangement being insulated from each other in any desired way as the link 62 carries high voltage current and the link 63 low voltage current. The contact 60 connects by a wire 209 with the other terminal of the primary 182 of the ignition-means transformer and the contact 61 connects, by a wire 210, with one terminal of the heating coil 72, the other terminal of which connects with one terminal of the closing coil 107, through a wire 211, the other terminal of this coil being connected with a wire 212 which connects with a wire 213, the wire 213 connecting with one terminal of the coil 108 and with one terminal of the secondary 204 of transformer 203. The other terminal of coil 108 connects, by a wire 214, with contact 104.

The wire 201 connects with the contact 74 and a wire 215 connects contact 75 with wire 202ª between the primary winding 202 and contact lever 205.

The secondary 204 of transformer 203 is in circuit with the controlling devices in the low-voltage circuit shown, in this instance, as the room thermostat and boiler controlled device of the preceding figures, the contact 129 of the boiler-controlled device being connected, by a wire 216, with the terminal of coil 204 opposite that connected with wire 213; the contact 128 with contact 117 of the room thermostat by a wire 217 and the other contact 120 of this device with the contact strip 207 of the relay switch by a wire 218 which latter connects, between its ends, with a wire 219 connected with the contact link 63.

In this arrangement the transformer 203 is energized at all times through the following circuit: wire 200, coil 202, wire 215, switch 73, and wire 201.

In this arrangement the closing of the circuit through the room thermostat by the drop of temperature in the room below the desired degree operates to energize the winding 107 for closing the motor switch, the circuit established being as follows: secondary 204 of transformer 203, wire 216, boiler-controlled device 121, wire 217, room thermostat, wire 218, wire 219, contact link 63, contact 61, wire 210, heating coil 72, winding 107 of the relay, wire 212, and 213 to secondary 204.

The energization of coil 107 causes the contact strips 205 and 207 to engage with the contacts 105 and 104, respectively, to close the motor circuit; the circuit for energizing the igniter means 28—29 and the holding circuit for the relay, the circuits thus established being as follows: wire 200, primary winding 182 of igniter-means transformer, wire 209, contact 60, wire 208, contact 105, contact strip 205, wire 202ª, wire 215, switch 73, and wire 201 thereby energizing the igniter means.

The circuit established for starting the motor is as follows: wire 200, motor 24, wire 208, contact 105, contact strip 205, wire 202ª, wire 215, switch 73, and wire 201.

The closing of the circuit at the contact 104 energizes the holding coil 108 by the following circuit: transformer secondary 204, wire 216, boiler-controlled device 121, wire 217, room thermostat, wire 218, contact strip 207, contact 104, wire 214, holding coil 108, and wire 213.

Assuming that there is combustion at the burner, the contact links 62 and 63 of the heat switch disengage from the contacts 60 and 61 as in the case of the previously described construction thus breaking the circuit in which the heating coil 72 and the closing coil 107 are interposed and also breaking the circuit containing the ignition means transformer, the circuits remaining closed at contacts 104 and 105 as the holding coil 108 remains energized.

Should combustion fail to occur at the burner the heating of the coil 72 under continuing current supplied thereto operates to open the switch 73 as explained of the previously described construction.

In the arrangement being described the contact link 62, controlling the igniter means is locked out in the same way as described in connection with the arrangement shown in Fig. 8.

It will be readily understood that while I have described the heat-switch comprising the contact links 62 and 63, as being located adjacent the flame of the burner, and which in such case may be located in the ash pit of the furnace, the control may be otherwise effected by the heat generated by the burner. Thus for example the thermostatic element of such a control device may be located in the smoke stack of the furnace wherein it operates responsive to the flow of heat therethrough.

In Figs. 10 and 11 I have disclosed a modification of the control means hereinbefore described and adapted for stack control. In this construction the switch proper is of the same construction as that shown in Figs. 2 and 4 in that it is formed of two contact links 62 and 63 which cooperate with stationary contacts 60 and 61, the links of Figs. 10 and 11, however, operating in a vertical plane, instead of a horizontal plane, and the contacts 60 and 61 being located below them, respectively. The contact links 62 and 63 are connected at their pivotal connection 64 with the actuating arm 69 as in the previously described construction, this arm being frictionally driven from a shaft 229 journalled in a tubular extension 230 of a casing 231 corresponding with the casing 32, the casing 231 being mounted at its extension 230 in an opening 232 in the wall of the stack 233 of the furnace equipped with the burner-control mechanism.

The shaft 229 extends into, and crosswise of, the stack 233 and is connected at its inner end with one end of a thermostatic helix or spiral coil 234 the other end of which is fastened to the casing extension 230, as represented at 235. The thermostatic coil 234 extends into the path of the hot gases passing through the stack and is so constructed, as for example as explained of the thermostatic coil 46, that change in the temperature of the stack-gases will cause the thermostatic coil to distort. In this particular arrangement the coil 234 is so constructed that, as the temperature in the stack increases the coil distorts into more closely coiled condition and as the temperature decreases it uncoils.

The friction drive of the arm 69 by the shaft 229, to permit of over-run movement of the shaft relative to this arm as explained in connection with the construction shown in Fig. 2, is effected through the medium of a coil spring 236 encircling the outer end of the shaft 229 between a stop 237 thereon and the arm 69 which latter is rotatable on the shaft and bears against a collar 238 on the latter.

The construction shown in Fig. 11 also comprises a relay-actuated switch device, a manually resettable heat switch, and locking means controlling the ignition means, for the purposes as explained of the corresponding structures of Fig. 2, but differing somewhat in form therefrom.

The switch member 98ª for closing the circuit at the contacts 104 and 105 and corresponding with the switch lever 98, instead of being spring-pressed to circuit-opening position is so weighted 98ᵇ as to cause it to move normally to this position, as shown.

The ignition-lockout member which is held out of operative position when the armature referred to is raised and corresponds with the bell-crank lever 109, is represented at 239 and is of the same general form as the bell-crank lever 109, except that it has a laterally-directed extension 240 adapted to form a stop preventing the link 62 from reengaging the contact 60 while the relay switch lever 98ª above referred to is in circuit-closing position.

The manually-resettable time switch comprises the contacts 241 and 242 corresponding with the contacts 74 and 75 respectively, of the previously described construction, the contact 241, being formed of a yieldable portion 243 backed by a spring 244. The contact 242 comprises a block 245 in which slides a tube 246 in electrical contact therewith and positioned in line with the contact 243. The tube 246 is surrounded by, and rigidly connected with, a spool 247 with an insulating bushing 248 therebetween, this spool cooperating with a thermostatic strip 249 like the strip 81. The lower end of the strip 249 is provided with a lug 250 adapted to engage under the spool 247, when the latter, together with the tube 246, are raised into a position in which the tube 246 engages the contact 243, the spool being provided with an upwardly-inclined surface 251 for camming the strip 249, in this raising movement, into a position for interlocking with the spool as stated.

The hand-settable device now being described also comprises a rod 252 which slides in the tube 246 and by means of which the latter and the spool 247 may be raised as stated, the rod 252 having an upwardly-facing shoulder 253 at which it abuts against the lower end of the tube 246. The parts are so arranged that when the operator pushes up on the rod 252 its upper end extends beyond the tube 246 thereby holding the contact 243 out of engagement with the contact-tube 246, until pressure on the rod 252 is discontinued, whereupon the spring 244 forces the contact 245 into engagement with the tube 246. Thus it is impossible to lock, or otherwise secure, the rod 252 in re-set position with the switch controlled thereby in closed position.

Adjacent the thermostatic strip 249 is a heating coil 254 corresponding with the coil 72 of the previously described construction, for controlling the position of the thermostatic strip 249.

The electrical connections with the several parts shown in this figure are the same as those of the corresponding parts in Figs. 2 and 8, the various wires of these connections being given the same numerals as in these last-referred-to figures.

In Figs. 12 and 13 a modification of the stack-controlled means and exemplifying the use of tiltable mercury switches, is shown.

In this construction the thermostatically controlled shaft 229 actuated as in the construction shown in Figs. 10 and 11, controls two tiltable mercury switches 255 and 256 corresponding to the contact links 62 and 63 and contacts 60 and 61. The switch 255 is mounted in a clip 257 rotatably supported on the shaft 229 and frictionally driven thereby as in the case of the arm 69 of Figs. 10 and 11, this clip having an upwardly extending arm 258 forming a stop for a clip 259 carrying the igniter-means-controlling switch 256 and pivotally connected with the shaft 229, the clip 259 and switch 256 rocking with the switch 255, except as the former may be restrained by the ignition lock means which comprises a bell-crank lever 260 pivoted at 261 and corresponding in function with the bell-crank lever 239 of Fig. 11.

The pivoted relay-controlled switch of this construction carries a three-contact tilting mercury switch 262 at its normally depressed end, its opposite end engaging the weighted arm of the lockout bell-crank lever 260.

The time-switch comprises a rock lever 263 supported on a pivot 264 and adapted to interlock at its lighter end with the hook-end of a thermostatic strip 265, like the strip 249 of Fig. 11 and controlled by a heating coil 266. The lever 263 has pivoted at its heavier end, a holder 267, as represented at 268, this holder having a lost-motion connection 269 at its free end with the lighter end of the lever 263.

The holder 267 supports a mercury switch 270 the circuit through which is closed in the normal locked position of the parts as shown in Fig. 13.

The resetting means for the switch 270 comprises a reciprocable rod 271 having a lost-motion connection 272 with the holder 267, it being noted that in the resetting of the switch 270, after release of the lever 263 from the thermostatic strip 265, the switch 270 will not assume circuit-closing position while the rod 271 is withdrawn and thus this rod may not be locked, or otherwise secured, in a position in which the switch 270 is closed and not subjected to release by the action of the heating coil 266.

In this arrangement the various contacts of the switches shown are connected in circuits as in the case of the corresponding switches of the construction shown in Fig. 11, the two contacts of switch 256 corresponding with the contact link 62 and contact 60; the contacts of switch 255 corresponding with the contact link 63 and contact 61; the contacts of switch 270 corresponding with the contacts 241 and 245, and the three contacts of switch 262 and represented at 262ª, 262ᵇ, and 262ᶜ, corresponding, respectively, with the contacts 104 and 105 and the switch lever 98ª cooperating therewith.

It will be understood from the foregoing description of Figs. 12 and 13 that the lockout bell-crank lever 260 when the switch device 262 is in circuit-closing position is normally urged toward a position in which it extends beneath the clip 259. Thus should the flame ignite at the burner and the switches 255 and 256 of the heat switch mechanism rotate in clockwise direction in Fig. 13, through the actuation of the thermostatic device 234 which will occur in the normal operation of the apparatus, the bell-crank lever 260 will rock into a position beneath the upwardly tilted clip 259, in which position the switch 256 is in circuit-breaking position, and hold this switch in such position until the switch 262, by the deenergizing of its operating relay, has returned to circuit-breaking position and the motor 24 has ceased to operate, the bell-crank lever 260, upon the breaking of the circuit through the switch 262 disengaging from the clip 259 and returning to the position shown in Fig. 13 for permitting the switch 256 to move to the circuit-closing position shown.

Referring to Fig. 14, this figure shows a modification of the ignition means lockout lever shown in Fig. 11, the position of the contact 60 and contact link 62 being the reverse of that shown in this figure. In this arrangement the lockout lever is illustrated at 273 it being shown as a bell crank lever having a fixed pivotal support at 274, this lever being weighted at 275 to cause it to rotate in counterclockwise direction in Fig. 14.

The mechanism also comprises a U-shaped lever 276 pivoted separately from the lever 275 on the pivot 274. The two legs of the lever 276 are represented at 277 and 278, the leg 278 having an inwardly turned portion 279 extending adjacent the upper leg of the lever 273. A coil spring 280 is confined between the leg 277 and the upper leg of the lever 273. To the right of the pivot 274 the lever 277 pivotally connects at 281 with the upper end of a link 282 the lower end of which pivotally connects at 283 with the switch armature 284 corresponding with the armature of Fig. 11.

The parts shown in Fig. 14 are in a position corresponding to the showing in Fig. 11, the lockout lever 273 extending out of the path of movement of the contact link 62 by reason of the position of the lever 277. When the armature 284 which controls the contacts 104 and 105, is raised by energizing the relay shown and the circuit at the contacts 104 and 105 is closed, the rod 282 swings the lever 277 in counterclockwise direction in Fig. 14 which causes the spring 280 to become compressed, the lever 273 bearing against the end of the contact link 62 with the result that as soon as the contact link 62 has been swung out of engagement with the contact 60 by the action of the thermostatic device 234 (Fig. 10) the lever 273 springs into a position in which it obstructs the return of the link 62 into engagement with the contact 60 until, and unless, the relay shown becomes deenergized and the circuit is broken at the contacts 104 and 105 which, it will be understood, control the motor circuit, the swinging of the lockout lever 273 out of engagement with the link 62 being effected by engagement therewith of the part 279 of lever 277 which in turn is rocked clockwise by the armature 284 through the medium of the link 282.

Fig. 15 illustrates another modification of the ignition lock means of Fig. 11. The lock lever of this construction and corresponding with the lock lever 239 of Fig. 11 is represented at 285 it being mounted on a fixed pivot 286 and tending to rock in clockwise direction in Fig. 15. The position of this lever is controlled by a vertically movable rod 287 which engages the underside of the horizontal arm 288 of lever 285 and pivotally connects at its lower end as represented at 289, with the armature 290 corresponding with the armature of Fig. 11 and controlling the making and breaking of the circuit at contacts 104 and 105, the rod 287 extending guidingly through an opening 291 in a lug 292 secured to the frame of the relay.

When the parts are in the position shown in Fig. 15 and the circuit is broken at the contacts 104 and 105 the lockout lever 285 is out of the path of movement of the contact link 62. Energization of the relay shown to close the circuit at the contacts 104 and 105 lowers the rod 287 and permits the lockout lever 285 to swing into a position for preventing the return movement of the contact link 62 into engagement with the contact 60, after this link has been swung out of engagement with the contact 60 by the action of the thermostatic means 234, until the armature 290 drops to the position shown in Fig. 15 for breaking the circuit at contacts 104 and 105 thereby breaking the motor circuit in which operation the rod 287 is raised and rocks the contact lever 285 in counterclockwise direction to the position shown in Fig. 15.

In Figures 16 and 17 I have illustrated certain circuit arrangements whereby the ignition controlling switch comprising the contact 60 and contact link 62 is not dependent for closing, in the case of extinguishment of the flame at the burner, upon the opening by the heating element of the manually resettable switch controlled by the heating element 72 as in the case of the arrangement shown in Figs. 8 and 9, but is controlled by means which operate to automatically effect re-cycling of the system, whereby should the flame at the burner become extinguished the ignition means after the lapse of a predetermined length of time, will be automatically reenergized.

Referring to the arrangement shown in Fig. 16, the parts therein shown and the various circuits are the same as in the arrangement shown in Fig. 8 (the devices and circuits shown in Fig. 8 for controlling the starting switch being omitted in this showing) except for the interposition in the circuit in which the closing switch is located, of a thermostatically controlled switch which is controlled by the ignition lockout means and operates, in the locked condition of the ignition switch upon the return of the heat switch to normal condition, but before the time switch has operated, to break the circuit which holds the motor switch in closed position.

The parts shown in Fig. 16 are given the same designating numerals as in the case of corresponding parts shown in Fig. 8, the arrangement in Fig. 16 being the same as that shown in Fig. 8 except for the addition of the thermostatically controlled switch device represented generally at 292, the switch proper 293 of which is interposed in the wire 187, and the heating coil 294 of which is interposed in a wire 295 connected at 296 with the wire 179 and with a contact 297 carried by, and insulated from, the bell-crank lever 109 and so positioned that when the contact link 62, upon extinguishment of the flame at the burner, is swung toward the contact 60, the contact 297 will be engaged by this contact link.

In this arrangement should the flame become extinguished at the burner, as for example by a momentary failure of supply of oil thereto, the engagement of the contact link 62 with the contact 297 closes the circuit in which the heating coil 294 is interposed by establishing the following circuit: wire 179, wire 295, heating coil 294, wire 295, contact 297, contact link 62, wire 188, switch 73, wire 187, switch 293, and switch 167 back to the other side of the line. The switch 293 comprises a stationary contact 298 and the flexible contact arm 299 which in the cold condition of the coil 294 is in engagement with the contact 298, the strip 299 being of bimetallic construction and when subjected to the heat of the coil 294 deflects out of engagement with the contact 298.

The breaking of the circuit at the switch 293 by the heating of coil 294 breaks the circuit through the coils 107 and 108 which de-energizes the relay 101 whereupon the switch arm 98 moves to circuit-breaking position and returns the ignition lock lever 111 to the position shown in Fig. 16 thereby breaking the circuit through the heating coil 294. As the contact arm 299 cools it moves into engagement with the contact 298 whereupon the system is caused to re-cycle as explained in connection with Fig. 8 in the initial starting of the system by the closing of the circuit at the thermostat, it of course being understood that in case of a failure of the fuel to ignite at the burner, the heat switch will remain closed and after the lapse of a predetermined length of time effect the opening of the manually re-settable time switch controlled by the coil 72.

The thermostatic switch element 299 and the heating coil 294 are preferably shielded from the surrounding atmosphere to the end that the element 293 will not cool unduly rapidly and close the circuit at this switch for the re-cycling operation, before such oil as may have become gasified or vaporized in the combustion chamber and remaining unignited, has been swept therefrom by the draft through this chamber. This shielding may be effected in any desirable way, as for example, by enclosing the major portion of the element 293 and the coil 294 in a box 292ª of insulating material as shown.

In Fig. 17 is shown an arrangement wherein the re-cycling switch is not in the heavy motor circuit which under some conditions may be desirable.

In this arrangement the parts are given the same designating numerals as the corresponding parts in the arrangement shown in Fig. 8, the circuit which controls the main switch 166 and 167 and which circuit is the same as in Fig. 8, being omitted.

In this arrangement the re-cycling switch represented at 300 and controlled by the ignition lockout lever 113 operates to automatically break the circuit through both the closing and holding coils 107 and 108 upon extinguishment of the flame at the burner and the responsive movement of the heat switch comprising the contact links 62 and 63.

The re-cycling switch 300 comprises a flexible thermostatic bi-metallic contact strip 301 provided with two contacts 302 and 303 insulated from each other and normally engaging fixed contacts 304 and 305, respectively, so arranged that in the movement of the strip 301 into engagement with these fixed contacts it will engage contact 305 before it engages contact 304. This switch also comprises a heating coil 306 shielded as represented at 307 and as described of the switch device 292 of Fig. 16.

One end of the coil 306 connects, by a wire 308, with a contact 309 carried by, and insulated from, the lever 111 and functioning as explained of the arrangement in Fig. 16. The other end of the coil 306 connects, by a wire 310, with wire 179 at 311. The wire 190 has interposed therein the contact 302 and the contact 304 and the wire 191 has interposed therein the contact 303 and the contact 305.

Should the flame at the burner become extinguished, as for example by temporary interruption in the supplying of oil to the burner, after the operation of the heat switch to circuit-breaking position by the heat generated by the burner, the contact link 62 engages the contact 309 thereby energizing the heating coil 306 and causing the strip 301 to deflect and move the contacts 302 and 303 out of engagement with the contacts 304 and 305 prior to thermostat 81 being sufficiently heated to release bell-crank 77 and permit switch 73 to open, thereby breaking the circuit through the closing and holding coils 107 and 108 whereupon the relay 101 becomes de-energized and the lockout lever 111 swings out of engagement with the contact link 62 which breaks the circuit through the coil 306. As the element 301 cools down the contacts 302 and 303 engage the contacts 304 and 305 thus re-establishing the circuit through the closing and holding coils 107 and 108 to effect re-cycling of the system.

While I have illustrated and described certain embodiments of my invention, I do not wish to be understood as intending to limit it thereto, as it may be embodied in other forms and arrangements without departing from the spirit of my invention.

What I claim as new, and desire to secure by Letters Patent, is:

1. The combination of a furnace, a burner therefor, fuel-supplying means for the burner, ignition means for the burner, electrical means controlled by the heat generated by the burner for controlling said fuel-supplying means and said ignition means and comprising a switch which, when closed, causes said ignition means to be energized and means for opening said switch after the igniting of the fuel at said burner, and releasable means comprising a movable member forming a stop for locking said switch against return to closed position following extinguishment of the flame at said burner.

2. The combination of a furnace, a burner therefor, fuel-supplying means for the burner, ignition means for the burner, electrical means controlled by the heat generated by the burner for controlling said fuel-supplying means and said ignition means and comprising a switch controlling the operation of said fuel-supplying means, a second switch which, when closed, causes said ignition means to be energized and means operated by the heat of combustion for opening said second switch after the igniting of the fuel at said burner, and releasable means controlled by said first-named switch for locking said second switch against return to closed condition following extinguishment of the flame at said burner and while said first-named switch is in condition for operation of said fuel-supplying means.

3. The combination of a furnace, a burner therefor, fuel-supplying means for the burner, ignition means for the burner, electrical means controlled by the heat generated by the burner for controlling said fuel-supplying means and said ignition means and comprising a switch which, when closed, causes said ignition means to be energized and means for opening said switch after the igniting of the fuel at said burner and exerting force tending to close said switch upon extinguishment of the flame at said burner, and releasable means resisting closing of said switch.

4. The combination of a furnace, a burner therefor, fuel-supplying means for the burner, ignition means for the burner, electrical means controlled by the heat generated by the burner for controlling said fuel-supplying means and said ignition means and comprising a movable element controlled by the heat generated by said burner, a switch having a movable member operated by said movable element and which, when closed, causes said ignition means to be energized, said movable element operating said movable member to open condition after the igniting of the fuel at said burner and tending to operate said movable member to closed condition upon extinguishment of the flame, and releasable means for locking said movable member against return to switch-closing position upon extinguishment of the flame.

5. The combination of a furnace, a burner therefor, fuel-supplying means for the burner, ignition means for the burner, electrical means controlled by the heat generated by the burner for controlling said fuel-supplying means and said ignition means and comprising a movable element controlled by the heat generated by said burner, a switch having a movable member, a spring operating in conjunction with said movable element to actuate said movable member in opposite directions for opening and closing said switch responsive to the igniting of the fuel at said burner and the extinguishment of the flame, respectively, said switch, when closed, causing said ignition means to be energized, and releasable means for locking said movable member against return to switch-closing position upon extinguishment of the flame.

6. The combination of a furnace, a burner therefor, fuel-supplying means for the burner, ignition means for the burner, electrical means controlled by the heat generated by the burner for controlling said fuel-supplying means and said ignition means and comprising a switch controlling said fuel-supplying means, a second switch controlling said ignition means, a heat-controlled device for actuating both of said switches operating to de-energize said ignition means after the igniting of the fuel at said burner and to exert force on said second switch in a direction to condition the latter for energizing said ignition means upon extinguishment of the flame at said burner, and releasable means for locking said second switch against return to closed position following extinguishment of the flame at said burner.

7. The combination of a furnace, a burner therefor, fuel-supplying means for the burner, ignition means for the burner, electrical means controlled by the heat generated by the burner for controlling said fuel-supplying means and said ignition means and comprising a movable element controlled by the heat generated by said burner, a switch having a stationary contact forming a stop and a movable member co-acting therewith, said switch when closed causing said ignition means to operate, a second stop co-acting with said movable member, a connection between said movable element and said movable member, a spring arranged to force said movable member against said stops alternately in the movements of said movable element in opposite directions, respectively, and means releasably locking said movable member in circuit-breaking position.

8. The combination of a furnace, a burner therefor, fuel-supplying means for the burner, ignition means for the burner, electrical means controlled by the heat generated by the burner for controlling said fuel-supplying means and said ignition means and comprising a movable element controlled by the heat generated by said burner, switches each having a stationary contact forming a stop and a movable member coacting therewith, one of said switches when closed causing said ignition means to operate, a second stop for the movable member of each of said switches, a connection between said movable element and said movable members, a spring engaging at its ends with said movable members and operating to force the latter against said stops alternately in the movements of said movable element in opposite directions, respectively, and means releasably locking said movable member of the one of said switches which controls said ignition means, in circuit-breaking position.

STANLEY PERRY.